US012729326B2

(12) United States Patent
Woo et al.

(10) Patent No.: US 12,729,326 B2
(45) Date of Patent: Sep. 8, 2026

(54) WINDOW AND DISPLAY DEVICE INCLUDING THE SAME

(71) Applicants: Samsung Display Co., Ltd., Gyeonggi-do (KR); SK Microworks Solutions Co., Ltd., Cheonan-si (KR)

(72) Inventors: Seokjong Woo, Cheonan-si (KR); Namhee Park, Hwaseong-si (KR); Hansol Kang, Cheonan-si (KR); Youngsang Park, Seoul (KR); Junki Park, Cheonan-si (KR); Inseok Seo, Asan-si (KR); Hyungwoo Cho, Cheonan-si (KR)

(73) Assignees: Samsung Display Co., Ltd., Yongin-si (KR); SK MICROWORKS SOLUTIONS CO., LTD., Cheonan-si (KR)

( * ) Notice: Subject to any disclaimer, the term of this patent is extended or adjusted under 35 U.S.C. 154(b) by 221 days.

(21) Appl. No.: 17/717,588

(22) Filed: Apr. 11, 2022

(65) Prior Publication Data

US 2022/0389290 A1 Dec. 8, 2022

(30) Foreign Application Priority Data

Jun. 3, 2021 (KR) ........................ 10-2021-0072358

(51) Int. Cl.

| | |
|---|---|
| ***C09J 133/08*** | (2006.01) |
| ***B32B 7/12*** | (2006.01) |
| ***B32B 17/00*** | (2006.01) |
| ***B32B 27/28*** | (2006.01) |
| ***B32B 27/36*** | (2006.01) |
| ***C09J 175/04*** | (2006.01) |
| ***C09J 183/04*** | (2006.01) |
| ***G02B 1/14*** | (2015.01) |

(52) U.S. Cl.

CPC ............... *C09J 133/08* (2013.01); *B32B 7/12* (2013.01); *B32B 17/00* (2013.01); *B32B 27/281* (2013.01); *B32B 27/36* (2013.01); *C09J 175/04* (2013.01); *C09J 183/04* (2013.01); *G02B 1/14* (2015.01); *B32B 2255/10* (2013.01); *B32B 2255/26* (2013.01); *B32B 2307/412* (2013.01); *B32B 2307/546* (2013.01); *B32B 2307/732* (2013.01); *B32B 2457/20* (2013.01)

(58) Field of Classification Search

None

See application file for complete search history.

(56) References Cited

U.S. PATENT DOCUMENTS

| | | | | |
|---|---|---|---|---|
| 5,668,242 | A * | 9/1997 | Simon .................. | C08G 63/672 528/274 |
| 8,929,085 | B2 | 1/2015 | Franklin et al. | |
| 9,069,521 | B2 | 6/2015 | Lee et al. | |
| 9,429,999 | B2 | 8/2016 | Lee et al. | |
| 10,281,956 | B2 | 5/2019 | Yang et al. | |
| 2008/0075951 | A1 | 3/2008 | Qiu et al. | |
| 2013/0271828 | A1* | 10/2013 | Everaerts ............ | B32B 37/1292 156/60 |
| 2014/0349052 | A1* | 11/2014 | Kim ........................... | C09J 7/29 428/201 |
| 2016/0053138 | A1* | 2/2016 | Lee ........................ | H10K 50/84 428/447 |
| 2022/0149326 | A1 | 5/2022 | Kang et al. | |

FOREIGN PATENT DOCUMENTS

| | | |
|---|---|---|
| CN | 114464079 | 5/2022 |
| KR | 10-2013-0078599 A | 7/2013 |
| KR | 10-2016-0024003 A | 3/2016 |
| KR | 10-2020-0038141 | 4/2020 |
| KR | 10-2020-0064909 | 6/2020 |
| KR | 10-2020-0083757 | 7/2020 |

* cited by examiner

*Primary Examiner* — Sheeba Ahmed

(74) *Attorney, Agent, or Firm* — Sughrue Mion, PLLC

(57) ABSTRACT

Provided is a window including a base layer, a hard coating layer disposed above the base layer, and a bonding layer disposed between the base layer and the hard coating layer. The bonding layer includes polysiloxane.

19 Claims, 7 Drawing Sheets

WINDOW AND DISPLAY DEVICE INCLUDING THE SAME

CROSS-REFERENCE TO RELATED APPLICATION(S)

This application claims priority to and benefits of Korean Patent Application No. 10-2021-0072358 under 35 U.S.C. § 119, filed on Jun. 3, 2021, the entire contents of which are incorporated herein by reference.

BACKGROUND

1. Technical Field

The disclosure herein relates to a window and a display devices including such a window. The window may have a hard coating layer.

2. Description of the Related Art

Various types of display devices used for multimedia devices such as a television set, a mobile phone, a tablet computer, a navigation system, and a game console are being developed. Recently, display devices which are foldable or rollable using flexible display members that are bendable are being developed to improve ease of portability and to increase user friendliness.

In order to protect a display surface of such a display device, a separate protection film may be applied to an upper portion of a window. Applying a separate protection film in addition to a base substrate of the window may increase the thickness of the display device. For that reason, there is a demand for a simplified window structure, as well as reducing manufacturing costs.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a durable window having a simplified structure.

The disclosure also provides a display device including a window as a single body without a separate protection film that maintains durability.

In an embodiment, a window may include a base layer, a hard coating layer disposed above the base layer, and a bonding layer disposed between the base layer and the hard coating layer, the bonding layer including polysiloxane.

In an embodiment, the bonding layer may be disposed directly on a lower surface of the hard coating layer and on an upper surface of the base layer.

In an embodiment, the base layer may include a polymer film or a glass substrate. The polymer film or the glass substrate may not be present in the window except the base layer.

In an embodiment, the lower surface of the hard coating layer may contact the bonding layer, and an upper surface of the hard coating layer may be an uppermost surface of the window that is exposed to the outside.

In an embodiment, the hard coating layer may include a fluorine-based compound.

In an embodiment, the bonding layer may further include 2-hydroxyethyl ester. The weight ratio of the polysiloxane to the 2-hydroxyethyl ester in the bonding layer may be about 1:1.

In an embodiment, a thickness of the bonding layer may be in a range of about 0.1 μm to about 1 μm.

In an embodiment, a thickness of the hard coating layer may be in a range of about 5 μm to about 20 μm.

In an embodiment, a thickness of the base layer may be in a range of about 50 μm to about 100 μm.

In an embodiment, the window may further include an optical bonding layer disposed directly on the lower surface of the base layer, the optical bonding layer including a polyurethane resin.

In an embodiment, a haze of the window is in a range of about 1% or less.

In an embodiment, a modulus of the window may be in a range of about 6 GPa or more.

In an embodiment, a display device may include a display module, a support module disposed below the display module, a window disposed above the display module, the window including a base layer, a hard coating layer disposed above the base layer, and a bonding layer disposed between the base layer and the hard coating layer and containing polysiloxane, a folding area that is folded with respect to a folding axis extending in a direction, and a non-folding area adjacent to the folding area.

In an embodiment, the bonding layer may be disposed directly on a lower surface of the hard coating layer and an on upper surface of the base layer.

In an embodiment, the window may include a single glass substrate or a single polymer film.

In an embodiment, the single polymer film may be a polyimide film or a polyethyleneterephthalate film.

In an embodiment, the lower surface of the hard coating layer may contact the bonding layer. An upper surface of the hard coating layer may be an uppermost surface of the window that is exposed to the outside.

In an embodiment, the hard coating layer may include a fluorine-based compound.

In an embodiment, the bonding layer may further include 2-hydroxyethyl ester. A weight ratio of the polysiloxane to the 2-hydroxyethyl ester in the bonding layer may be about 1:1.

In an embodiment, the display device may further include a window adhesive layer disposed between the display module and the window.

In an embodiment, the support module may include a support plate including openings that correspond to the folding area.

In an embodiment, a display device may include a display module and a window disposed on the display module, the window including a base layer, a hard coating layer that is disposed on an upper surface of the base layer and is formed as a single layer, and a bonding layer disposed between the base layer and the hard coating layer and contacting the base layer and the hard coating layer, the bonding layer including polysiloxane.

In an embodiment, the bonding layer may further include 2-hydroxyethyl ester. A weight ratio of the polysiloxane to the 2-hydroxyethyl ester in the bonding layer may be about 1:1.

In an embodiment, the window may further include an optical bonding layer disposed on the lower surface of the base layer, the optical bonding layer including a polyurethane resin.

In an embodiment, the hard coating layer may include a fluorine-based compound. An upper surface of the hard coating layer may be an uppermost surface of the window that is exposed to the outside.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1A:
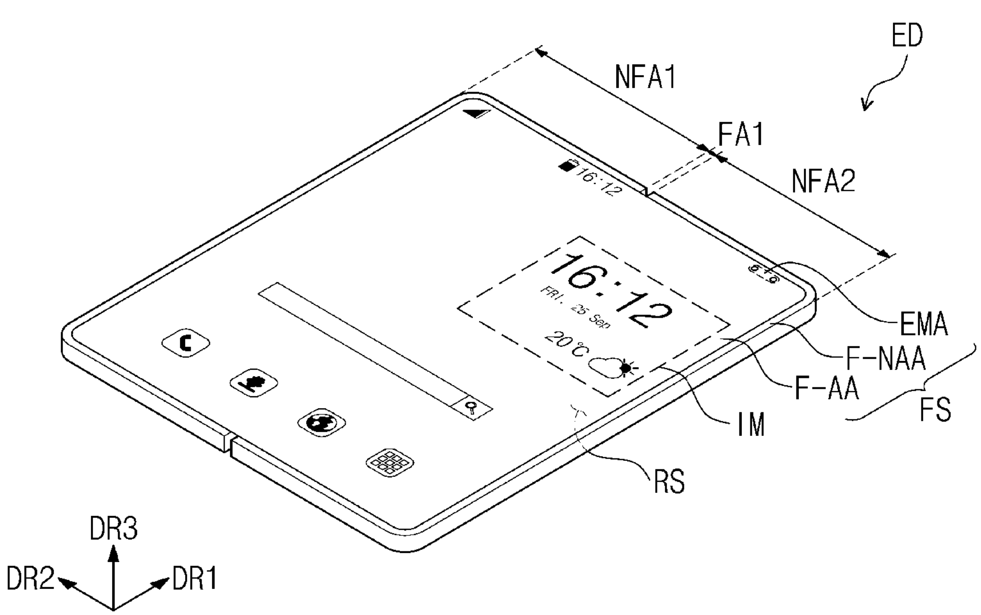
FIG. 1A is a schematic perspective view illustrating a display device in an unfolded state according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the description, when an element (or a region, a layer, a portion, etc.) is referred to as being "on," "connected to," or "coupled to" another element, it means that the element may be directly disposed on/connected to/coupled to the other element, or that a third element may be disposed between the coupled/connected elements.

In the description, "directly disposed" may indicate that there is no layer, film, region, plate or the like added between a portion of a layer, a film, a region, a plate or the like and other portions. For example, "directly disposed" may indicate disposing without additional members such as an adhesive member between two layers or two members.

Like reference numerals refer to like elements. Also, in the drawings, the thickness, the ratio, and the dimensions of elements are exaggerated for an effective description of technical contents. The term "and/or," includes all combinations of one or more of which associated configurations may define.

It will be understood that, although the terms "first," "second," and etc. may be used herein to describe various elements, these elements should not be limited by these terms. These terms are only used to distinguish one element from another. For example, a first element could be termed a second element, and, similarly, a second element could be termed a first element, without departing from the scope of the embodiments. The terms of a singular form may include plural forms unless the context clearly indicates otherwise.

Terms such as "below," "lower," "above," "upper," and the like are used to describe the relationship of the configurations shown in the drawings. The terms are used as a relative concept and are described with reference to the direction indicated in the drawings. In the description, it should be understood that when an element is referred to as "disposed on," it may be as disposed "above" or "under" the other element.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, a window according to an embodiment and a display device according to an embodiment will be described with reference to the accompanying drawings.

Figure 1B:
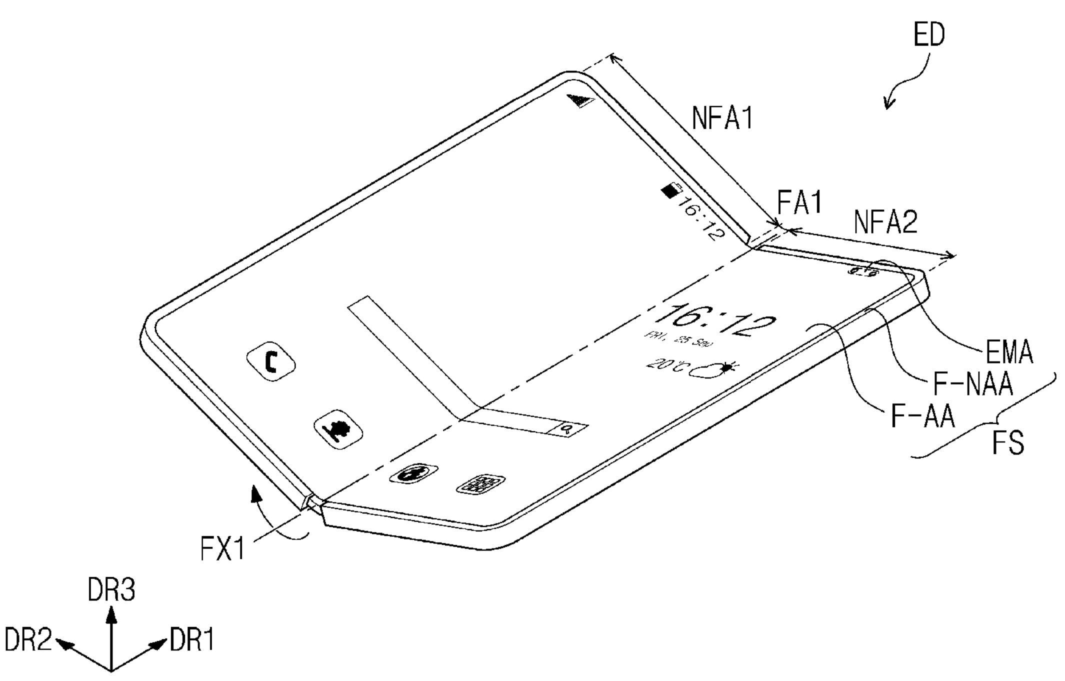
FIG. 1B is a schematic perspective view illustrating an inner-folding process of the display device according to an embodiment shown in FIG. 1A.
Figure 1C:
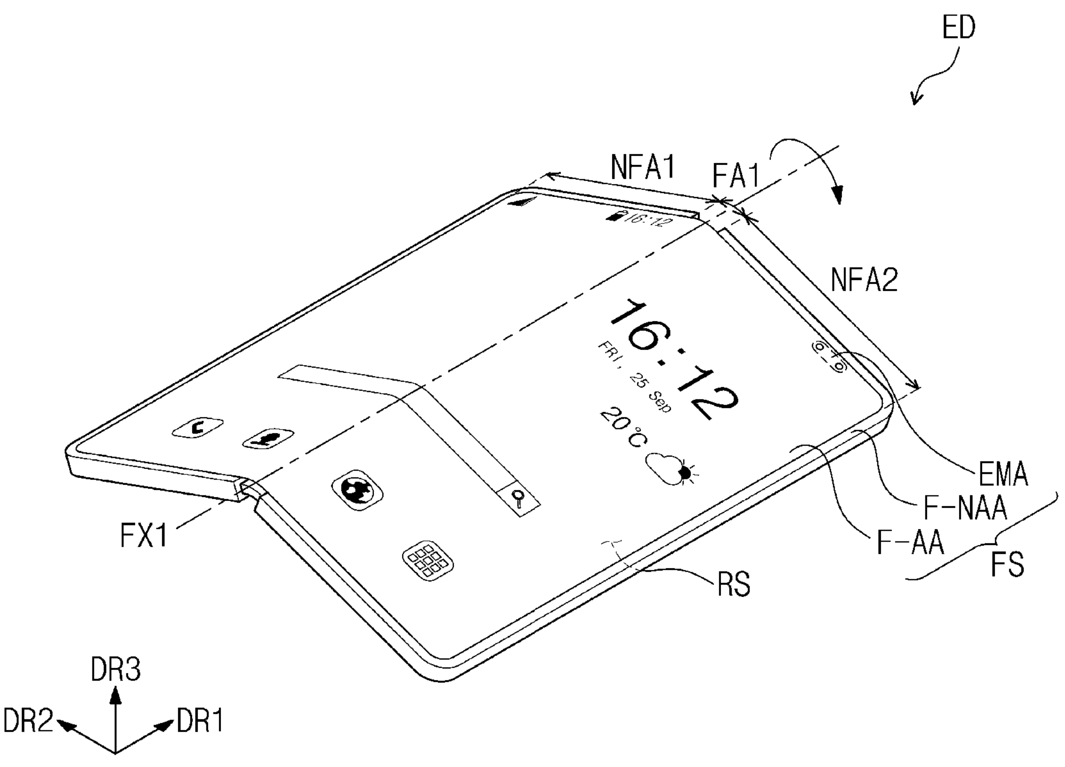
FIG. 1C is a schematic perspective view illustrating an outer-folding process of the display device according to an embodiment shown in FIG. 1A.

FIG. 1A is a schematic perspective view illustrating a display device in an unfolded state according to an embodiment. FIG. 1B is a schematic perspective view illustrating an inner-folding process of the display device shown in FIG. 1A. FIG. 1C is a schematic perspective view illustrating an outer-folding process of the display device shown in FIG. 1A.

A display device ED of an embodiment may be a device activated according to electrical signals. For example, the display device ED may be a mobile phone, a tablet, a car navigation system, a game console, or a wearable device, but the embodiment is not limited thereto. In FIG. 1A, etc. of the description, as an example, the display device ED is shown as a mobile phone.

Referring to FIGS. 1A to 1C, the display device ED according to an embodiment may include a first display surface FS defined by a first directional axis DR1 and a second directional axis DR2 crossing the first directional axis DR1. The display device ED may provide an image IM to users through the first display surface FS. The display device ED of an embodiment may display the image IM towards a third directional axis DR3 on the first display surface FS respectively parallel to the first directional axis DR1 and the second directional axis DR2. In the description, a front surface (or an upper surface) and a rear surface (or a lower surface) of respective members are defined with respect to a direction in which the image IM is displayed. Front and rear surfaces may oppose each other in the third directional axis DR3 and the normal direction of each of the front and rear surfaces may be parallel to the third directional axis DR3.

The display device ED according to an embodiment may include the first display surface FS and a second display surface RS. The first display surface FS may include a first active area F-AA and a first peripheral area F-NAA. The first active area F-AA may include an electronic module area EMA. The second display surface RS may be defined as a surface facing at least a portion of the first display surface FS. For example, the second display surface RS may be defined as a portion of the rear surface of the display device ED.

The display device ED according to an embodiment may detect external inputs applied from the outside. The external inputs may include various forms of inputs provided from outside the display device ED. For example, the external inputs may include external inputs applied when approaching the display device ED or being adjacent at a selected distance (e.g., an input device hovering over the display device ED), as well as contact by a part of a body such as a user's hand. In addition, the external inputs may have various forms such as force, pressure, temperature, light, etc.

FIG. 1A and the following drawings illustrate the first to third directional axes DR1 to DR3, and directions indicated by the first to third directional axes DR1, DR2, and DR3 described herein are relative concepts, and may thus be changed to other directions. The directions indicated by the first to third directional axes DR1, DR2, and DR3 may be described as first to third directions, and the same reference numerals may be used.

The first display surface FS of the display device ED may include a first active area F-AA and a first peripheral area F-NAA. The first active area F-AA may be an area activated according to electrical signals. The display device ED according to an embodiment may display the image IM through the first active area F-AA. The first active area F-AA may detect various forms of external inputs. The first peripheral area F-NAA is adjacent to the first active area F-AA. The first peripheral area F-NAA may have a selected color. The first peripheral area F-NAA may surround the first active area F-AA. Accordingly, the shape of the first active area F-AA may be substantially defined by the first peripheral area F-NAA. This illustration is an example, and the first peripheral area F-NAA may be disposed adjacent to only one side of the first active area F-AA, or may be omitted. The display device ED according to an embodiment may include various forms of active areas and is not limited to any particular embodiment.

The display device ED may include a folding area FA1 and non-folding areas NFA1 and NFA2. The display device ED may include non-folding areas NFA1 and NFA2. The display device ED according to an embodiment may include a first non-folding area NFA1 and a second non-folding area NFA2 disposed with the folding area FA1 between them. FIGS. 1A to 1C illustrate an embodiment of the display device ED including a single folding area FA1, but the embodiment is not limited thereto, and in the display device ED, multiple folding areas may be defined.

Referring to FIG. 1B, the display device ED according to an embodiment may be folded with respect to the first folding axis FX1. The first folding axis FX1 is a virtual axis extending in a direction of the first directional axis DR1, and the first folding axis FX1 may be parallel to a long side direction of the display device ED. The first folding axis FX1 may extend along the first directional axis DR1 on the first display surface FS.

In an embodiment, the non-folding areas NFA1 and NFA2 may be disposed adjacent to the folding area FA1 with the folding area FA1 between them. For example, the first non-folding area NFA1 may be disposed at a side of the folding area FA1 in the second direction DR2, and the second non-folding area NFA2 may be disposed at another side of the folding area FA1 in the second direction DR2.

The display device ED may be folded with respect to the first folding axis FX1 to become inner-folded such that an area overlapping the first non-folding area NFA1 and the other area overlapping the second non-folding area NFA2 on the first display surface FS face each other.

In the display device ED according to an embodiment, the second display surface RS may be viewed in an inner-folded state by users. The second display surface RS may further include an electronic module area in which an electronic module including various components is disposed, and is not limited to any particular embodiment.

Referring to FIG. 1C, the display device ED may be folded with respect to the first folding axis FX1 to become outer-folded such that an area overlapping the first non-folding area NFA1 and the other area overlapping the second non-folding area NFA2 on the second display surface RS face each other.

However, the embodiment is not limited thereto, and the display device ED may be folded with respect to multiple folding axes such that portions of each of the first display surface FS and the second display surface RS may face each other, and the number of folding axes and the number of the corresponding non-folding areas are not particularly limited.

The electronic module area EMA may have various electronic modules disposed therein. For example, the electronic module may include at least any one among a camera, a speaker, a light detection sensor, and a heat detection sensor. The electronic module area EMA may detect an external subject received through the first and second display surfaces FS and RS, or provide sound signals such as voice to the outside through the first and second display surfaces FS and RS. The electronic module may include other components, and is not limited to any particular embodiment.

The electronic module area EMA may be surrounded by the first active area F-AA and the first peripheral area F-NAA. However, the embodiment is not limited thereto, and the electronic module area EMA may be disposed in the first active area F-AA, but is not limited to any particular embodiment.

Figure 2A:
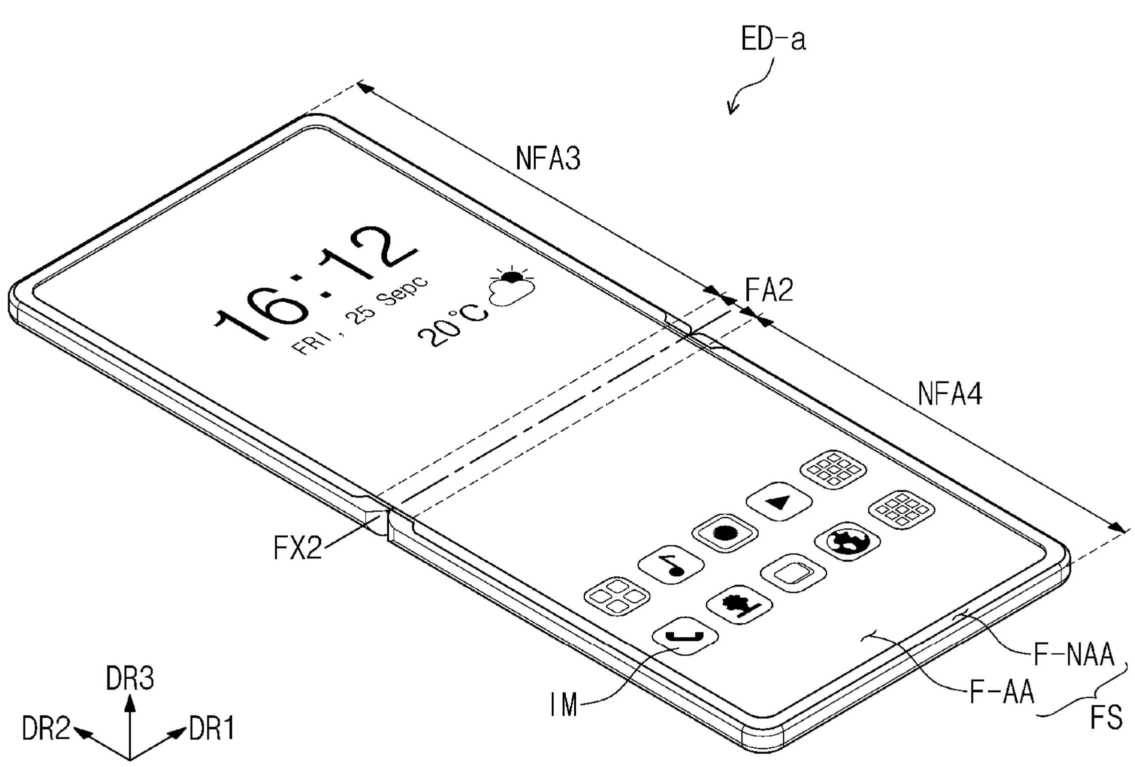
FIG. 2A is a schematic perspective view illustrating a display device in an unfolded state according to an embodiment.
Figure 2B:
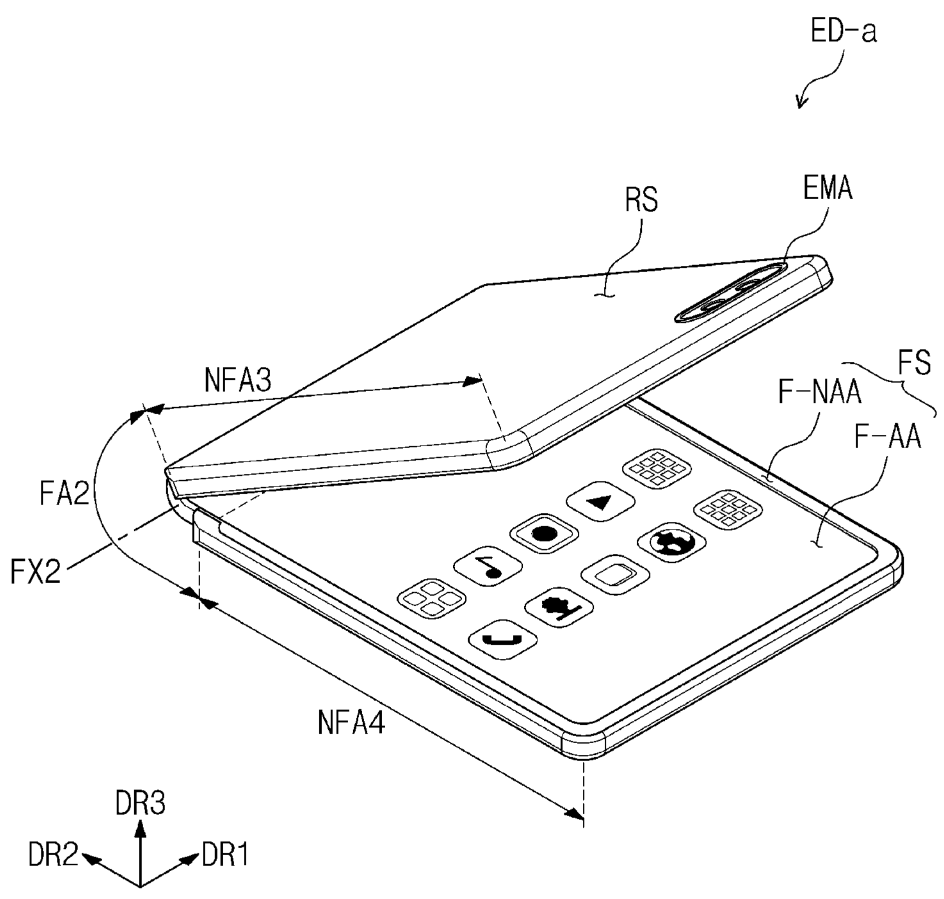
FIG. 2B is a schematic perspective view illustrating an inner-folding process of the display device according to an embodiment shown in FIG. 2A.

FIG. 2A is a schematic perspective view illustrating a display device in an unfolded state according to an embodiment. FIG. 2B is a schematic perspective view illustrating an inner-folding process of the display device shown in FIG. 2A.

A display device ED-a of an embodiment may be folded with respect to a second folding axis FX2 extending in a direction parallel to the first directional axis DR1. FIG. 2B illustrates the second folding axis FX2 extending in a direction that is parallel to the short side of the display device ED-a. However, the embodiment is not limited thereto.

The display device ED-a according to an embodiment may include at least one folding area FA2 and non-folding areas NFA3 and NFA4 adjacent to the folding area FA2. The non-folding areas NFA3 and NFA4 may be disposed to be spaced apart from each other with the folding area FA2 disposed between them.

The folding area FA2 may have a selected curvature and a selected radius of curvature. In an embodiment, the first non-folding area NFA3 and the second non-folding area NFA4 may face each other, and the display device ED-a may be inner-folded such that the display surface FS is not exposed to the outside.

In other embodiments, the display device ED-a may be outer-folded such that the display surface FS is exposed to the outside. In an embodiment, when the display device ED-a is in the unfolded state, the first display surface FS may be viewed by users and when in the inner-folded state, the second display surface RS may be viewed by users. The second display surface RS may include an electronic module area EMA in which electronic modules including various components are disposed.

The display device ED-a according to an embodiment may include the second display surface RS, and the second display surface RS may be defined as a surface facing at least a portion of the first display surface FS. In case that the display device ED-a is in the inner-folded state, the second display surface RS may be viewed by users. The second display surface RS may include an electronic module area EMA in which electronic modules including various components are disposed. In an embodiment, images may be provided through the second display surface RS.

In an embodiment, the display devices ED and ED-a may be configured such that an inner-folding operation or an outer-folding operation is alternately repeated from an unfolding operation, but the embodiments are not limited thereto. In an embodiment, the display devices ED and ED-a may have an unfolding operations, an inner-folding operations, and outer-folding operations.

Figure 3:
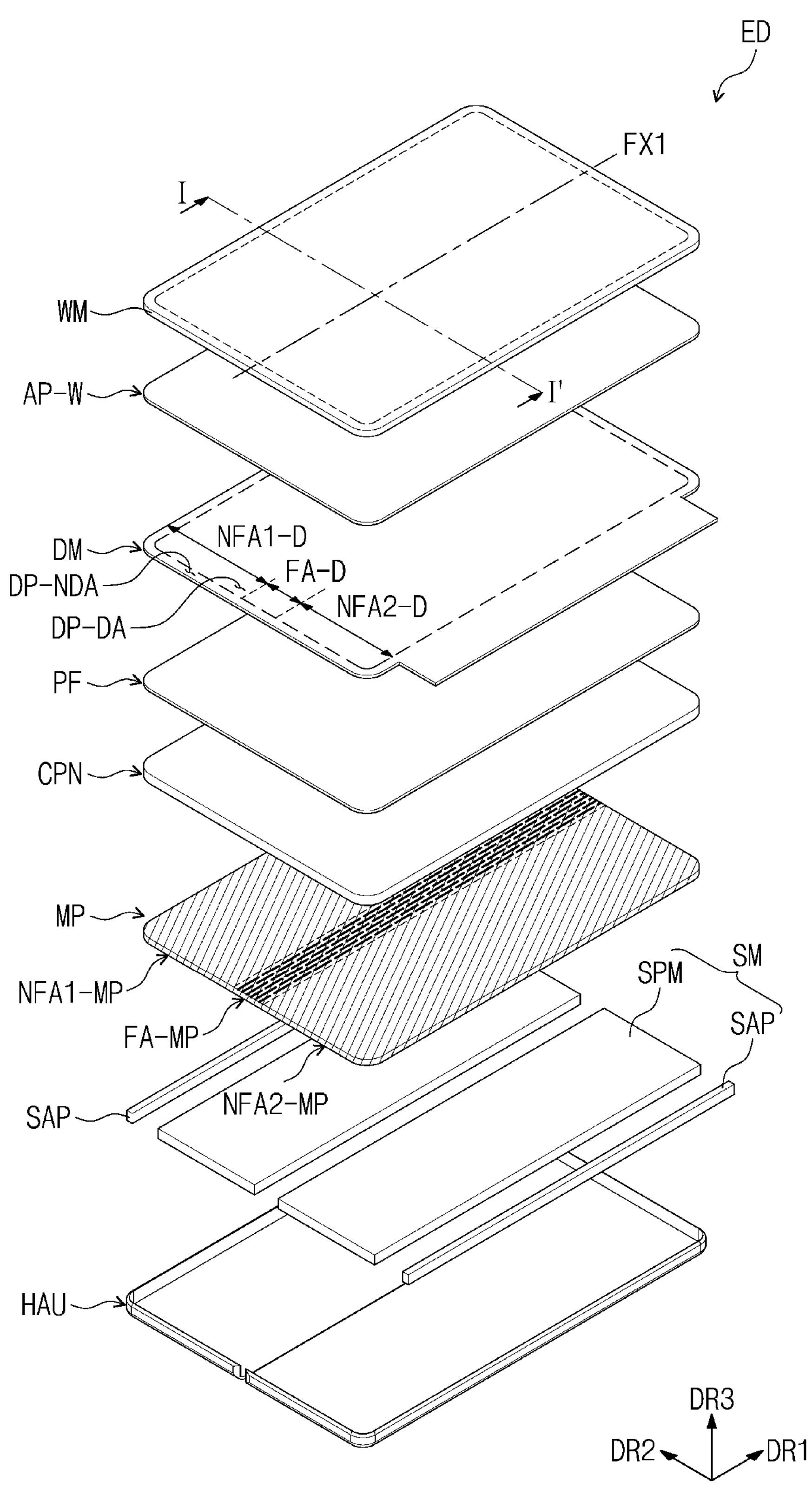
FIG. 3 is an exploded schematic perspective view of a display device according to an embodiment.
Figure 4:
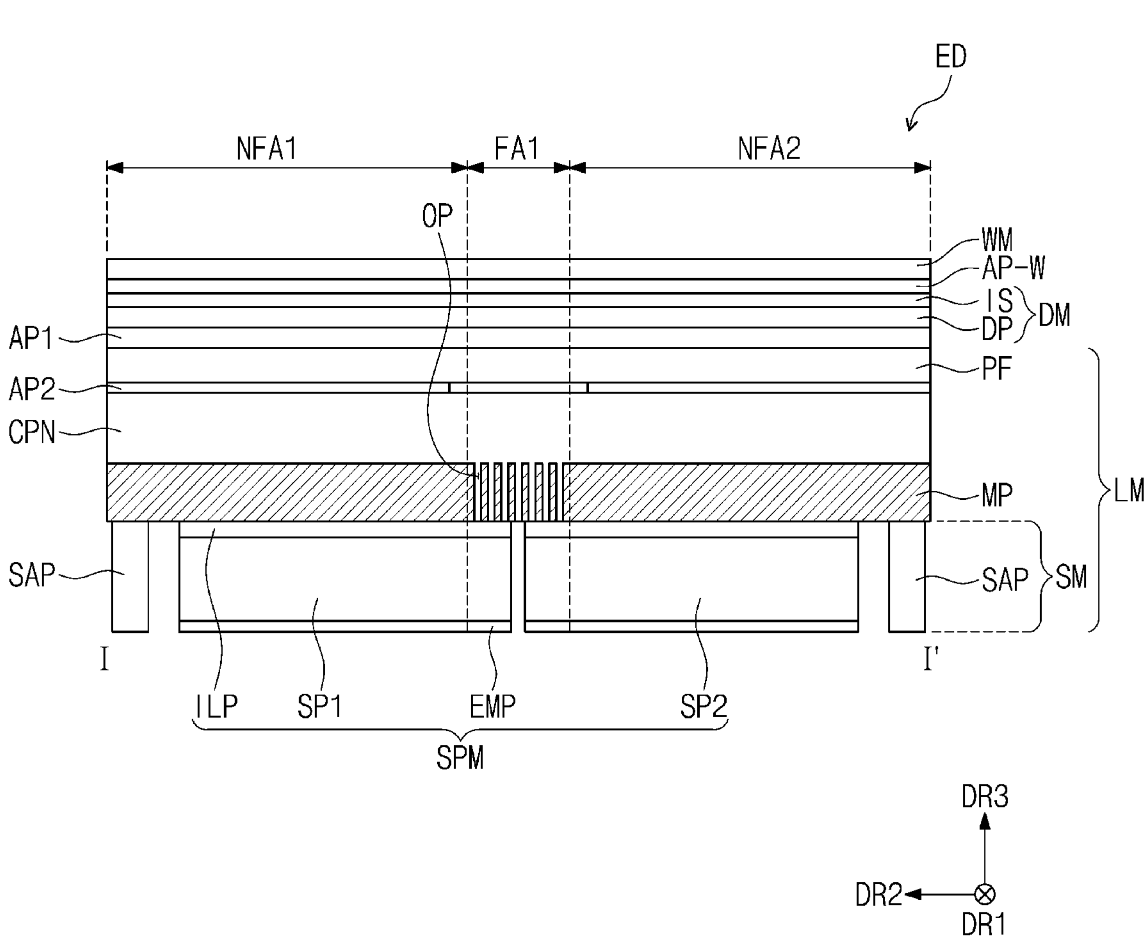
FIG. 4 is a schematic cross-sectional view of a display device according to an embodiment.

FIG. 3 is an exploded schematic perspective view of a display device according to an embodiment, and FIG. 4 is a schematic cross-sectional view of a display device according to an embodiment. FIG. 3 illustrates an exploded schematic perspective view of a display device according to an embodiment shown in FIG. 1A as an example. FIG. 4 is a schematic cross-sectional view showing a portion corresponding to line I-I' of FIG. 3.

Referring to FIGS. 3 and 4, the display device ED of an embodiment may include a display module DM and a window WM disposed above the display module DM. The display device ED of an embodiment may further include a support module LM disposed below the display module DM.

The window WM may cover the entire outside of the display module DM. The window WM may have a shape corresponding to the shape of the display module DM. The display device ED of an embodiment may include a housing HAU accommodating the display module DM, the support module LM, etc. The housing HAU may be combined with the window WM. Although not shown, the housing HAU may further include a hinge structure to make folding or bending easy.

In the display device ED of an embodiment, the display module DM may display images in response to electrical signals and transmit/receive information on external inputs. The display module DM may be defined as a display area DP-DA and a non-display area DP-NDA. The display area DP-DA may be defined as an area outputting images provided from the display module DM.

The non-display area DP-NDA is adjacent to the display area DP-DA. For example, the non-display area DP-NDA may surround the display area DP-DA. The non-display area DP-NDA may be defined in various shapes, and is not limited to any particular embodiment. According to an embodiment, the display area DP-DA of the display module DM may correspond to at least a portion of a first active area F-AA (refer to FIG. 1A).

The display module DM may include a display panel DP, and an input sensor IS disposed on the display panel DP. Although not shown, the display module DM may further include an optical layer (not shown) disposed on the input sensor IS. The optical layer (not shown) may serve to reduce reflection due to external light. For example, the optical layer (not shown) may include a polarizing layer or a color filter layer.

The display panel DP may include a display element layer. For example, the display element layer may include an organic electroluminescence element, a quantum dot light emitting element, or a liquid crystal element layer. However, the embodiments are not limited thereto.

In the display device ED according to an embodiment, the input sensor IS may include sensing electrodes for detecting external inputs. The input sensor IS may be a capacitance sensor, but is not particularly limited thereto. The input sensor IS may be directly formed on the display panel DP through a continuous process when the display panel DP is manufactured. However, the embodiment is not limited thereto, and the input sensor IS may be manufactured as a separate panel from the display panel DP, and be attached to the display panel DP through an adhesive layer (not shown).

In the display device ED according to an embodiment, the display module DM may include a folding display portion FA-D and non-folding display portions NFA1-D and NFA2-D. The folding display portion FA-D may be a portion corresponding to the folding area FA1 (refer to FIG. 1A), and the non-folding display portions NFA1-D and NFA2-D may be portions corresponding to the non-folding areas NFA1 and NFA2 (refer to FIG. 1A).

The folding display portion FA-D may correspond to a portion that is folded or bent with respect to the first folding axis FX1. The display module DM may include a first non-folding display portion NFA1-D and a second non-folding display portion NFA2-D, and the first non-folding display portion NFA1-D and the second non-folding display portion NFA2-D may be spaced apart from each other with the folding display portion FA-D between them.

The window WM according to an embodiment is disposed on the display module DM. The window WM may include an optically transparent insulating material. The window WM may protect the display panel DP and the input sensor IS. The image IM (refer to FIG. 1A) generated from the display panel DP may be provided to users by being transmitted through the window WM. The window WM may provide a touch surface of the display device ED. In the display device ED including the folding area FA1, the window WM may be a flexible window which is foldable.

Figure 5:
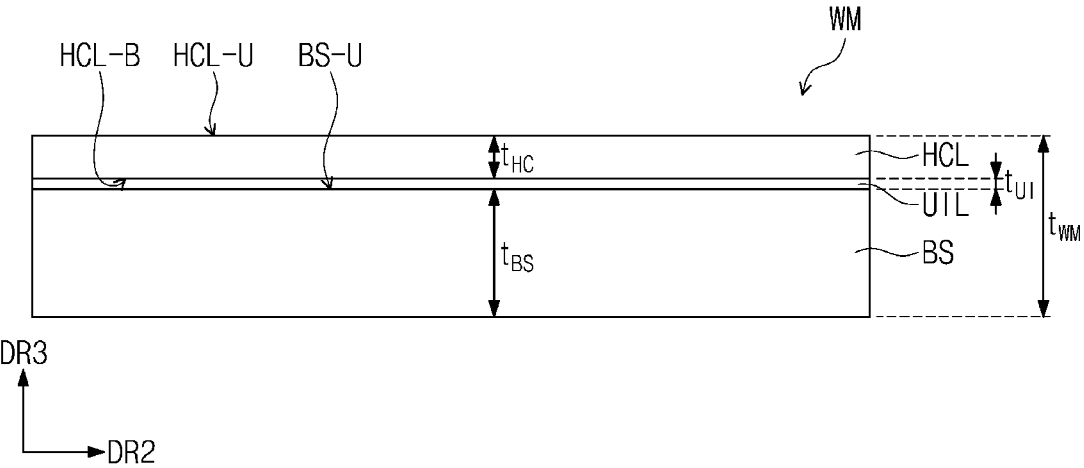
FIG. 5 is a schematic cross-sectional view of a window according to an embodiment.

The window WM may include a glass substrate or a polymer film as a base layer BS (refer to FIG. 5). The window WM according to an embodiment may include a hard coating layer HCL (refer to FIG. 5) and a bonding layer UIL (refer to FIG. 5) disposed between the base layer BS (refer to FIG. 5) and the hard coating layer HCL (refer to FIG. 5). The window WM according to an embodiment will be described in more detail later.

The display device ED of an embodiment may include a window adhesive layer AP-W disposed between the window WM and the display module DM. The window adhesive layer AP-W may be an optically clear adhesive film (OCA) or an optically clear adhesive resin layer (OCR). In other embodiments, the window adhesive layer AP-W may be omitted.

In the display device ED according to an embodiment, the support module LM may include at least one of a support plate MP, a lower module SM, a protection layer PF, and a buffer layer CPN. For example, the display device ED according to an embodiment may include the support plate MP disposed below the display module DM, the protection layer PF disposed between the support plate MP and the display module DM, and the lower module SM disposed below the support plate MP.

In an embodiment, the support plate MP may be disposed below the display module DM. In an embodiment, the support plate MP may include a metal material or a polymer material. For example, the support plate MP may be formed including stainless steel, aluminum, copper, or an alloy thereof. As another example, the support plate MP may be formed from a polymer material.

Openings OP may be defined in the support plate MP. The openings OP of the support plate MP may be defined to correspond to the folding area FA1. The thickness of the support plate MP may vary depending on device design characteristics of the display device ED, mechanical properties of the display device ED, and the like. For example, the support plate MP may have a thickness of about 150 μm, but the embodiment is not limited thereto.

Referring to FIGS. 3 and 4, a protection layer PF may be disposed between the display module DM and the support plate MP. The protection layer PF may be a layer disposed below the display module DM to protect a rear surface of the display module DM. The protection layer PF may overlap the entire display module DM. The protection layer PF may include a plastic material. For example, the protection layer PF may be a polyimide film or a polyethyleneterephthalate film. However, the material of the protection layer PF is not limited thereto.

The display device ED according to an embodiment may include the lower module SM. The lower module SM may include a support member SPM and a filling portion SAP. The support member SPM may overlap most regions of the display module DM. The filling portion SAP may be disposed outside the support member SPM and overlap the outer edge of the display module DM.

The lower module SM may include support layers SP1 and SP2. The support layers SP1 and SP2 may include a first sub support layer SP1 and a second sub support layer SP2, which are spaced apart from each other in the second directional axis DR2 direction. The first sub support layer SP1 and the second sub support layer SP2 may be spaced apart from each other at a portion corresponding to the first folding axis FX1. The support layers SP1 and SP2 are spaced apart from each other in the folding area FA1 to serve as the first sub support layer SP1 and the second sub support layer SP2, thereby improving folding or bending characteristics of the display device ED. Although not shown, the support layers SP1 and SP2 may include a cushion layer (not shown) and a lower support plate (not shown) which are stacked in the thickness direction.

The lower support plate (not shown), like the support plate MP, may include a metal material or a polymer material. For example, the lower support plate may include stainless steel, aluminum, copper, or an alloy thereof.

The cushion layer (not shown) may prevent the support plate MP from being pressed and plastically deformed due to external impact and force. The cushion layer (not shown) may include sponge, foam, or an elastomer such as urethane resin. The cushion layer (not shown) may include at least one of an acrylic polymer, a urethane-based polymer, a silicone-based polymer, and an imide-based polymer. However, the embodiment is not limited thereto. The cushion layer (not shown) may be disposed below the support plate MP or below the lower support plate (not shown).

The lower module SM may further include at least one of a shielding layer EMP and an interlayer bonding layer ILP. The shielding layer EMP may be an electromagnetic wave shielding layer or a heat dissipation layer. The shielding layer EMP may serve as a bonding layer. The lower module SM and the housing HAU may be bonded using the shielding layer EMP.

The lower module SM may further include the interlayer bonding layer ILP disposed above the support layers SP1 and SP2. The interlayer bonding layer ILP may bond the support plate MP and the lower module SM. The interlayer bonding layer ILP may be comprised of a bonding resin layer or an adhesive tape. For example, a portion of the interlayer bonding layer ILP overlapping the folding display portion FA-D may be removed. However, the embodiment is not limited thereto, and the interlayer bonding layer ILP may overlap the entire folding display portion FA-D.

The filling portion SAP may be disposed outside the support layers SP1 and SP2. The filling portion SAP may be disposed between the support plate MP and the housing HAU. The filling portion SAP may fill a space between the support plate MP and the housing HAU and fix the support plate MP.

Referring to FIGS. 3 and 4, the display device ED according to an embodiment may include the buffer layer CPN in the support module LM. The buffer layer CPN may compensate the thickness below the display module DM or support the display module DM. In other embodiments, the buffer layer CPN may be omitted.

Components included in the support module LM in the display device ED according to an embodiment may vary depending on the size and shape of the display device ED or operation characteristics of the display device ED.

The display device ED of an embodiment may include an adhesive layer AP1 or AP2. For example, the first adhesive layer AP1 may be disposed between the display module DM and the protection layer PF. The second adhesive layer AP2 may be disposed between the protection layer PF and the buffer layer CPN. The adhesive layer AP1 or AP2 may be an optically clear adhesive film (OCA) or an optically clear adhesive resin layer (OCR). However, the embodiment is not limited thereto, and the adhesive layer AP1 or AP2 may be an adhesive layer having a transmittance of 80% or less. Although not shown, the display device ED of an embodiment may further include an adhesive layer disposed between the buffer layer CPN and the support plate MP.

FIG. 3 illustrates the folding axis FX1 being parallel to the long side of the display device ED, but the embodiment is not limited thereto, and the folding axis may be parallel to the short side of the display device.

Figure 6:
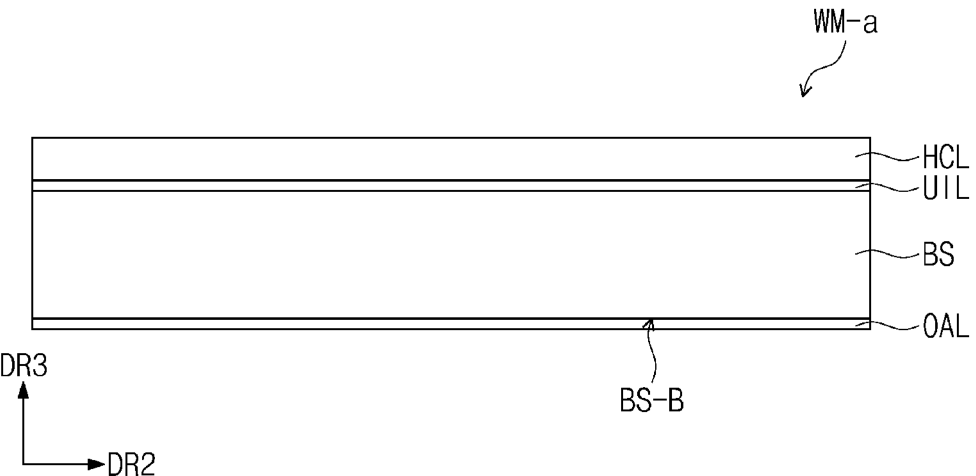
FIG. 6 is a schematic cross-sectional view of a window according to an embodiment.

FIGS. 5 and 6 are schematic cross-sectional views showing a window according to an embodiment. Windows WM and WM-a of an embodiment may include a base layer BS, a hard coating layer HCL disposed on the base layer BS, and a bonding layer UIL disposed between the base layer BS and the hard coating layer HCL. The window WM-a of an embodiment may include an optical bonding layer OAL disposed on a lower surface of the base layer BS.

In the windows WM and WM-a according to an embodiment, the base layer BS may be a glass substrate or a polymer film. For example, when the base layer BS is a glass substrate, the base layer BS may be a tempered glass substrate.

When the base layer BS is a polymer film, the base layer BS may be made of, for example, polyimide (PI), polyethyleneterephthalate (PET), polyacrylate, polymethylmethacrylate (PMMA), polycarbonate (PC), polyethylenenaphthalate (PEN), polyvinylidene chloride, polyvinylidene difluoride or (PVDF), polystyrene (PS), ethylene vinylalcohol copolymer, or a combination thereof. However, the material of the base layer BS used in an embodiment is not limited to these polymer materials, and any material having optical transparency, which provides images provided from the display module DM (refer to FIG. 3) of the display device ED (refer to FIG. 3) to users may be used without limitation. For example, the windows WM and WM-a of an embodiment may include a transparent polyimide film or a transparent polyethyleneterephthalate film as the base layer BS.

The base layer BS may have a thickness $t_{BS}$ in a range of about 50 μm to about 100 μm. When the base layer BS has a thickness $t_{BS}$ of less than 50 μm, the base layer BS is not capable of serving as a support layer provided with the hard coating layer HCL or the like, or protecting the lower display module DM (refer to FIG. 3). When the base layer BS has a thickness $t_{BS}$ of greater than 100 μm, the overall thickness of the display device ED (refer to FIG. 3) may increase. When the display device ED is folded as shown in FIGS. 1A to 2B, increasing thickness of the base layer BS may deteriorate folding characteristics.

The windows WM and WM-a of an embodiment may include one (a single) base layer BS. The windows WM and WM-a of an embodiment may include one (a single) glass substrate or one (a single) polymer film. For example, the windows WM and WM-a of an embodiment may not include an additional glass substrate or an additional polymer film other than the base layer BS in contact with the bonding layer UIL.

The hard coating layer HCL may be disposed above the base layer BS. In the windows WM and WM-a of an embodiment, the hard coating layer HCL may include a hard coating agent and an antifouling additive.

For example, the hard coating layer HCL may include a hard coating layer resin including at least one of an organic-based composition, an inorganic-based composition, and an organic-inorganic composite composition. For example, the hard coating agent forming the hard coating layer may include at least one of an acrylate-based compound, a siloxane compound, and a silsesquioxane compound. The hard coating agent may further include inorganic particles.

In an embodiment, the hard coating layer HCL may include a fluorine-based compound as an antifouling additive. In an embodiment, the hard coating layer HCL may include perfluorohexylethyl acrylate or the like as an antifouling additive. However, the embodiment is not limited thereto.

For example, in the window WM and WM-a of an embodiment, the hard coating layer HCL may be formed from a hard coating layer resin including a urethane acrylate compound, an acrylic acid ester compound, and a fluorine-based compound.

In the windows WM and WM-a of an embodiment, the hard coating layer HCL may be provided as a single layer. For example, in the windows WM and WM-a of an embodiment, the hard coating layer HCL, as a single layer, may increase the durability of the windows WM and WM-a and may also serve as a functional layer such as an anti-fingerprint layer or an antifouling layer.

In the windows WM and WM-a of an embodiment, the hard coating layer HCL may have a thickness $t_{HC}$ in a range of about 5 μm to about 20 μm. When the hard coating layer HCL has a thickness $t_{HC}$ of less than 5 μm, the hard coating layer HCL becomes less capable of protecting the base layer BS, which may reduce the durability of the windows WM and WM-a. When the hard coating layer HCL has a thickness $t_{HC}$ of less than 5 μm, the hard coating layer HCL may not have sufficient surface hardness to protect the display module DM (refer to FIG. 3). When the hard coating layer HCL has a thickness of greater than 20 μm, the thickness of the windows WM and WM-a may increase, which may not be suitable for a thin display device or a foldable display device.

In the windows WM and WM-a of an embodiment, a lower surface HCL-B of the hard coating layer HCL may be in contact with the bonding layer UIL, and an upper surface HCL-U of the hard coating layer HCL may be an uppermost surface exposed to the outside. For example, the windows WM and WM-a of an embodiment may not include an additional glass substrate or an additional polymer film above or below the hard coating layer HCL other than the base layer BS.

The windows WM and WM-a of an embodiment may include the bonding layer UIL containing polysiloxane. In an embodiment, the bonding layer UIL may be directly disposed on the lower surface HCL-B of the hard coating layer HCL and the upper surface BS-U of the base layer BS. The bonding layer UIL may contact base layer BS and the hard coating layer HCL.

In an embodiment, the bonding layer UIL may include polysiloxane and 2-hydroxyethyl ester. The bonding layer UIL according to an embodiment may include polysiloxane and 2-hydroxyethyl ester in a weight ratio of about 1:1.

In the windows WM and WM-a of an embodiment, the bonding layer UIL may have a thickness $t_{UI}$ in a range of about 0.1 μm to about 1 μm. The bonding layer UIL having a thickness in a range of about 0.1 μm to about 1 μm may increase the bonding strength between the base layer BS and the hard coating layer HCL.

Referring to FIG. 6, the window WM-a of an embodiment may include an optical bonding layer OAL disposed below the base layer BS. The optical bonding layer OAL may include a polyurethane resin. The window WM-a of an embodiment may include the optical bonding layer OAL to exhibit improvements in optical properties such as transmittance and reflectance.

The windows WM and WM-a of an embodiment including the bonding layer UIL between the base layer BS and the hard coating layer HCL may exhibit a lower coefficient of friction than a base substrate (e.g., a polyimide film, etc.) that does not include a bonding layer and a hard coating layer serving as a functional layer. The windows WM and WM-a of an embodiment including the bonding layer UIL between the base layer BS and the hard coating layer HCL may improve abrasion resistance and chemical resistance compared to a base substrate (e.g., a polyimide film, etc.) that does not include a bonding layer and a hard coating layer serving as a functional layer. The windows WM and WM-a of an embodiment may have improved optical characteristics such as increased light transmittance and reduced reflectance.

In the following embodiments, a window according to an embodiment will be described in detail. The Examples shown below are presented only for the understanding of the embodiments, and the scope of the embodiments is not limited thereto.

EXAMPLES

1. Manufacturing of Windows

A transparent polyimide film having a thickness of about 50 μm was prepared, and an optical bonding layer resin was provided on a surface of the polyimide film. The optical bonding layer resin is a coating solution having elements shown in Table 1 below. The optical bonding layer resin having the elements shown in Table 1 below was applied on a surface of the polyimide film through a die coating method.

TABLE 1

| Item | Element | wt % |
|---|---|---|
| Diluent for coating | isopropyl alcohol | 48.93% |
| | acetylacetone | 6.52% |
| | xylene | 40.42% |
| | n-Butyl Acetate | 1.71% |
| Binder | polyurethane | 2.36% |
| Curing agent | Toluene Diisocyanate | 0.05% |

The optical bonding layer resin was applied on a surface of the polyimide film, and was heat treated at about 110° C. for about 2 minutes to dry a coating diluent, and the optical bonding layer resin was cured to form an optical bonding layer having a thickness of about 0.1 μm. A bonding layer resin was provided on the other surface of the polyimide film facing the surface of the polyimide film provided with the optical bonding layer. The bonding layer resin is a coating solution having elements shown in Table 2 below. The bonding layer resin having the elements shown in Table 2 below was applied on the other surface of the polyimide film through a die coating method.

TABLE 2

| Item | Element | wt % |
|---|---|---|
| Diluent for coating | Ethyl alcohol | 7.14% |
| | Water | 9.18% |
| | Isopropyl alcohol | 81.60% |
| Binder | 2-hydroxyethyl ester | 1.02% |
| | Polysiloxane | 1.02% |
| Curing agent | Triethylamine | 0.04% |

The bonding layer resin was applied on the other surface of the polyimide film, and was heat treated at about 120° C. for about 6 minutes to dry a coating diluent, and the bonding layer resin was cured to form a bonding layer having a thickness of about 0.1 μm. A hard coating layer was formed on the bonding layer. A hard coating layer resin was provided on the bonding layer. The hard coating layer resin is a coating solution with elements shown in Table 3 below. The hard coating layer resin with elements shown in Table 3 below was applied on the bonding layer through a die coating method.

TABLE 3

| Item | Element | wt % |
|---|---|---|
| Diluent for coating | Propylene glycol methyl ether | 75.00% |
| Binder | Urethane Acrylate | 14.15% |
| | Acrylic ester | 9.43% |
| Photo initiator | 1-Hydroxy-cyclohexyl-phenyl-ketone | 1.18% |
| Antifouling additive | Perfluorohexylethyl Acrylate | 0.24% |

The hard coating layer resin was applied on the bonding layer, and was heat treated at about 60° C. for about 3 minutes to dry the coating diluent. UV light of 1J was irradiated to cure the hard coating layer resin, thereby forming a hard coating layer having a thickness of about 5 μm.

2. Evaluation of Physical Properties

Tables 4 to 7 below show the physical properties of the Example windows which were manufactured through the method of an embodiment described above.

Table 4 shows haze, yellowness, adhesion strength, surface resistance, and modulus values of the windows of an embodiment (the Example windows). The measured values shown in Table 4 shows measured values for the windows manufactured through the method of an embodiment described above, and the standard measurement methods for each physical property is indicated.

TABLE 4

| Item | Unit | Measured values | Test Method |
|---|---|---|---|
| Haze | % | 0.75 | ISO 14782 |
| Yellowness | Index | 1.6 | ASTM D 1925 |
| Adhesion Strength | Grade | 5B | ASTM D 3359 |
| Surface resistance | Ω/□ | $5*10^9$ | ANSI/ESD STM S11.11 |
| Modulus | GPa | 7.3 | ASTM D 638-03 |

Referring to the results of Table 4, the window according to an embodiment (the Example windows) exhibited optical properties with a haze in a range of about 1% or less. The window according to an embodiment had a modulus value in a range of about 6 GPa or more, confirming that its shape stability against external forces is high.

Table 5 below compared the physical properties of the windows of Examples and Comparative Examples manufactured through the window manufacturing method of an embodiment described above. In Table 5, Comparative Examples correspond to polyimide films without hard coating layers and bonding layers. In Table 5, the polyimide films used in Example 1 and Comparative Example 1 were the same type, and the polyimide films used in Example 2 and Comparative Example 2 were the same type. The thickness of Examples 1 and 2 corresponds to a thickness $t_{WM}$ (refer to FIG. 5) of the window, which is the sum of the thicknesses of the polyimide film, the bonding layer, the hard coating layer, and the optical bonding layer. Transmittance shown in Table 5 was measured through the ISO 13468 method, and reflectance was measured as the SCI reflectance using CM3700A from Minolta. The friction coefficient was measured through the ASTM D 1894 method.

TABLE 5

| Item | Example 1 | Comparative Example 1 | Example 2 | Comparative Example 2 |
|---|---|---|---|---|
| Thickness (μm) | 55 | 50 | 55 | 50 |
| Transmittance (%) | 91.2 | 89.5 | 92.3 | 88.4 |
| Reflectance (%) | 6.4 | 8.2 | 7.5 | 11.3 |
| Friction coefficient | 0.121 | 0.708 | 0.127 | 1.051 |

Referring to the results in Table 5, when comparing evaluation results of Examples and Comparative Examples using the same base layer, for example, the same polyimide film, both Example 1 and Example 2 exhibited higher transmittance and lower reflectance than their Comparative Examples. The Examples 1 and 2 showed improved optical properties. The friction coefficients of Examples 1 and 2 were lower than those of the Comparative Examples. The windows of Examples 1 and 2 exhibited improved optical properties and improved mechanical properties compared to Comparative Examples 1 and 2 which did not have the hard coating layer and the bonding layer.

Table 6 below shows evaluation results of surface damage caused by solvents to a Comparative Example compared to an Example according to the embodiments. The surface damage measured in Table 6 may be related to the chemical resistance of the surface on which the hard coating layer resin is provided during the manufacturing process according to the embodiments. The chemical resistance was evaluated based on changes in roughness of the surface before and after application of a propylene glycol methyl ether (PGME) solvent that is included in the hard coating layer resin. The chemical resistance was evaluated based on the difference in roughness before and after the solvent provision.

In Table 6, the Comparative Example corresponds to a polyimide film, and the Example corresponds to a polyimide film provided with a bonding layer. The PGME solvent (which is included in the resin used to form the hard coating layer) was applied to the Comparative Example and the Example.

TABLE 6

| | Comparative Example | | Example | |
|---|---|---|---|---|
| Item | Before solvent provision | After solvent provision | Before solvent provision | After solvent provision |
| Roughness (μm) | 0.031 | 0.107 | 0.032 | 0.042 |
| Roughness difference (μm) | 0.076 | | 0.01 | |

Referring to Table 6, the difference in roughness before and after the providing of the solvent is smaller in the Example compared to the Comparative Example. Accordingly, the bonding layer used in the Example, improves chemical resistance against the resin used to form the hard coating layer. When the hard coating layer resin is provided on a bonding layer, chemical resistance may be improved compared to when the hard coating layer resin is directly provided on the polyimide film.

Table 7 below shows evaluation results of abrasion resistance and chemical resistance for the windows of Comparative Example and Example. The Comparative Example shown in Table 7 used a window where the hard coating layer is directly disposed on the base layer without a bonding layer. The Example used a window of an embodiment manufactured through the window manufacturing method described above (including a bonding layer disposed between the hard coating layer and the base layer). Abrasion resistance and chemical resistance were evaluated by applying a load of 1 kg on the window of Example and repeatedly abrading the window with an eraser to observe changes in the surface before and after the abrasion. The abrasion resistance was evaluated based on changes in contact angle of an upper surface of the window before and after the eraser abrasion test, and the chemical resistance was evaluated based on changes in contact angle of an upper surface of the window after providing ethanol before and after the eraser abrasion test.

TABLE 7

| Comparative Example | | Example | |
|---|---|---|---|
| Abrasion resistance | chemical resistance | Abrasion resistance | chemical resistance |
| 8000 times | 2500 times | 15000 times | 13000 times |

Referring to the results of Table 7, there was no change in the window surface of the Example until 15000 repetitions of the abrasion resistance test, indicating improved abrasion resistance properties compared to the Comparative Example where changes occurred after 8000 repetitions of the abrasion resistance test. Accordingly, the window of an embodiment exhibits improved abrasion resistance. In the Example, there was no change in the window surface until 13000 repetitions of the chemical resistance test, indicating improved chemical resistance properties compared to the Comparative Example where changes occurred in the window surface after 2500 repetitions. Accordingly, the window of an embodiment may exhibit improved chemical resistance.

Based on the evaluation results of Tables 4 to 7 described above, the window according to the embodiments may have improved optical properties, abrasion resistance, and chemical resistance.

A window of an embodiment may include a bonding layer between a base layer and a hard coating layer to increase the bonding strength of the hard coating layer, and may thus improve durability and optical properties. In contrast to windows that include a separate protection film to protect the window substrate (such as a base layer), a window of an embodiment may bond a hard coating layer to a base layer using a bonding layer without additional protection film. Thus, the window of an embodiment may reduce the overall thickness of the window and simplify the window manufacturing process.

A display device of an embodiment may include a window including a bonding layer between a base layer and a hard coating layer to improve durability, and the manufacturing process may exclude a step of providing a separate protection film, simplifying the manufacturing process of the display device and reducing manufacturing costs. The display device of an embodiment may include a window as a single body provided by bonding a hard coating layer and a base layer through a bonding layer, and may thus exhibit improved durability and folding characteristics.

A window of an embodiment may include a bonding layer between a hard coating layer and a base layer, and may thus exhibit improved durability without a separate protection film.

A display device according to an embodiment may include a window having a bonding layer disposed between a hard coating layer and a base layer, and thus may exhibit a simplified structure without a separate protection film. A display device according to an embodiment may include a bonding layer to increase bonding strength of a hard coating layer, and thus may improve durability.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A window comprising:

a base layer;

a hard coating layer disposed above the base layer, the hard coating layer integrally formed as a single layer; and a bonding layer disposed between the base layer and the hard coating layer, the bonding layer includes polysiloxane and 2-hydroxyethyl ester, wherein the hard coating layer and the base layer are bonded to each other via the bonding layer, and wherein a weight ratio of the polysiloxane to the 2-hydroxyethyl ester in the bonding layer is about 1:1.

2. The window of claim 1, wherein the base layer includes a polymer film or a glass substrate, and the polymer film or the glass substrate is not present in the window except the base layer.

3. The window of claim 1, wherein a lower surface of the hard coating layer contacts the bonding layer, and an upper surface of the hard coating layer is an uppermost surface of the window that is exposed to the outside.

4. The window of claim 1, wherein the hard coating layer comprises a fluorine-based compound.

5. The window of claim 1, wherein a thickness of the hard coating layer is in a range of about 5 μm to about 20 μm.

6. The window of claim 1, wherein a thickness of the base layer is in a range of about 50 μm to about 100 μm.

7. The window of claim 1, further comprising:

an optical bonding layer disposed directly on a lower surface of the base layer, the optical bonding layer including a polyurethane resin.

8. The window of claim 1, wherein a haze of the window is in a range of about 1% or less.

9. The window of claim 1, wherein a modulus of the window is in a range of about 6 GPa or more.

10. A display device comprising:

a display module;

a support module disposed below the display module;

a window disposed above the display module, the window including:

a base layer;

a hard coating layer disposed above the base layer, the hard coating layer integrally formed as a single layer; and a bonding layer disposed between the base layer and the hard coating layer, the bonding layer including polysiloxane;

a folding area that is folded with respect to a folding axis extending in a direction; and a non-folding area adjacent to the folding area, wherein the hard coating layer and the base layer are bonded to each other via the bonding layer, wherein the support module comprises a support plate including openings that correspond to the folding area, wherein the base layer is a single glass substrate or a single polymer film, and wherein the single polymer film is a polyimide film or a polyethyleneterephthalate film.

11. The display device of claim 10, wherein a lower surface of the hard coating layer contacts the bonding layer, and an upper surface of the hard coating layer is an uppermost surface of the window that is exposed to the outside.

12. The display device of claim 10, wherein the hard coating layer comprises a fluorine-based compound.

13. The display device of claim 10, wherein the bonding layer further comprises 2-hydroxyethyl ester, and a weight ratio of the polysiloxane to the 2-hydroxyethyl ester in the bonding layer is about 1:1.

14. The display device of claim 10, further comprising:

a window adhesive layer disposed between the display module and the window.

15. A display device comprising:

a display module; and a window disposed on the display module, the window including:

a base layer;

a hard coating layer that is disposed on an upper surface of the base layer, the hard coating layer being integrally as a single layer; and a bonding layer disposed between the base layer and the hard coating layer and contacting the base layer and the hard coating layer, the bonding layer including polysiloxane and 2-hydroxyethyl ester, wherein the hard coating layer and the base layer are bonded to each other via the bonding layer.

16. The display device of claim 15, wherein a weight ratio of the polysiloxane to the 2-hydroxyethyl ester in the bonding layer is about 1:1.

17. The display device of claim 15, wherein the window further includes:

an optical bonding layer disposed on a lower surface of the base layer, the optical bonding layer including a polyurethane resin.

18. The display device of claim 15, wherein the hard coating layer comprises a fluorine-based compound, and an upper surface of the hard coating layer is an uppermost surface of the window that is exposed to the outside.

19. The window of claim 1, wherein a thickness of the bonding layer is in a range of about 0.1 μm to about 1 μm.

* * * * *